United States Patent [19]

Numata

[11] 4,012,749
[45] Mar. 15, 1977

[54] STROBO FLASH LIGHT DEVICE FOR CAMERAS

[75] Inventor: Saburo Numata, Urawa, Japan

[73] Assignee: Fuji Photo Optical Co., Ltd., Omiya, Japan

[22] Filed: Sept. 29, 1975

[21] Appl. No.: 617,635

[30] Foreign Application Priority Data

Sept. 30, 1974 Japan .............. 49-111599

[52] U.S. Cl. .............. 354/145; 354/147
[51] Int. Cl.² .............. G03B 15/03; G03B 15/05
[58] Field of Search .......... 354/145, 126, 139, 147, 354/149; 315/156

[56] References Cited

UNITED STATES PATENTS

| | | | |
|---|---|---|---|
| 3,252,394 | 5/1966 | Jakob et al. | 354/126 |
| 3,254,580 | 6/1966 | Bider et al. | 354/145 X |
| 3,294,002 | 12/1966 | Vitkine | 354/145 X |
| 3,354,315 | 11/1967 | Preston et al. | 354/147 X |
| 3,481,660 | 12/1969 | Sheldon | 354/126 X |
| 3,782,258 | 1/1974 | Boekkool et al. | 354/126 |
| 3,869,604 | 3/1975 | Prochnow | 354/126 X |
| 3,953,864 | 4/1976 | Iwata et al. | 354/145 X |

Primary Examiner—Donald A. Griffin
Attorney, Agent, or Firm—Gerald J. Ferguson, Jr.; Joseph J. Baker

[57] ABSTRACT

An accessory shoe on the camera body is provided with a light emitter such as an LED, and a foot of the strobo flash light unit to be mounted in the shoe is provided with a photodetector such as a silicon photocell to detect light emitted by the light emitter. The light emitter is connected with an electric source in the camera and a switch closed upon release of the shutter. The photodetector is connected with a switching circuit for closing a trigger circuit of the strobo flash light tube energizing circuit to discharge the strobo flash light tube upon release of the shutter.

8 Claims, 1 Drawing Figure

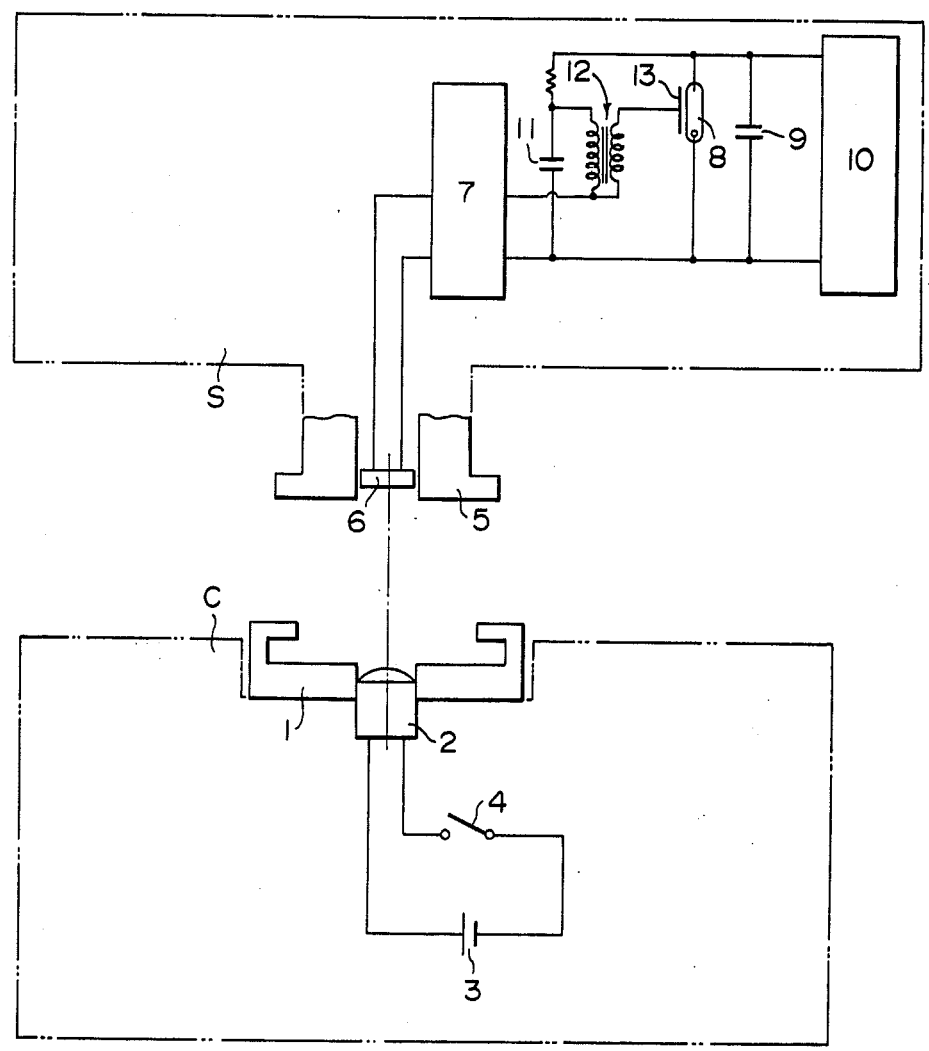

STROBO FLASH LIGHT DEVICE FOR CAMERAS

BACKGROUND OF THE INVENTION

1. Field of the Invention

This invention relates to a strobo flash light device, and more particularly to a strobo flash light device to be attached to a camera body and energized upon release of the shutter of the camera.

2. Description of the Prior Art

The conventional strobo flash light device to be attached to a camera body has an electric contact on the foot thereof to be inserted into an accessory shoe provided on the camera body so that the electric contact may be put into contact with an electric contact in the shoe and the electric circuit for energization of the strobo flash light tube may be operated in synchronization with the shutter release. The contact in the accessory shoe is connected with a switch which is closed upon the release of the shutter in the camera.

The above described conventional strobo flash light device is disadvantageous in that the strobo flash light device may sometimes malfunction due to incomplete contact between the contacts at the shoe. Further, the photographer may sometimes receive an electric shock since the electric contact is exposed on the foot of the device.

SUMMARY OF THE INVENTION

The primary object of the present invention is to provide a strobo flash light device which does not have an electric contact to eliminate said defects inherent in the conventional strobo flash light device.

Another object of the present invention is to provide a strobo flash light device which is operated upon release of the shutter in the camera by use of a photocoupler.

The strobo flash light device in accordance with the present invention is characterized in that the foot of the device to be inserted into an accessory shoe is provided with a photodetector and the shoe is provided with a light emitting means which emits light upon release of the shutter. The light emitting means emits light in synchronization with the release of the shutter in the camera and the photodetector detects the emission of light and sends a signal to a trigger circuit for energizing the strobo flash light tube. The light emitting means emits light with high response and the photodetector detects the light with high response so that the trigger circuit may be closed in accurate synchronization with the shutter release.

The photodetector is connected with a switching circuit which closes the trigger circuit when it receives a signal from the photodetector. The switching circuit has a function to differentiate between the signal from the photodetector indicating that the light emitting means in the shoe of the camera has emitted light and other noise caused by ambient light.

BRIEF DESCRIPTION OF THE DRAWING

The single FIGURE in the drawing shows an embodiment of the strobo flash light device with the present invention.

DESCRIPTION OF THE PREFERRED EMBODIMENTS

Referring to the drawing, an accessory shoe 1 provided on the camera body C has a light emitter 2 such as a light emitting diode which is connected with an electric source 3 and a switch 4. The switch 4 is connected with a shutter release mechanism (not shown) so as to be closed upon the release of the shutter. Thus, the light emitter 2 emits light with high response in synchronization with the shutter release. The source 3 may be the same source as used for an electric circuit for controlling exposure time. The light emitter 2 may be provided on the face of the shoe 1 or may be located under the shoe and a light guide means such as an optical fiber bundle may be provided between the face of the shoe 1 and the light emitter 2.

A strobo flash ligh unit S has a foot 5 to be inserted into the accessory shoe 1 on the camera body C. The foot 5 is provided with a photodetector 6 at such a position as to receive light emitted by said light emitter 2. The photodetector 6 is required to have a high response in order to effect an accurate synchronization, and accordingly, a silicon photocell or selenium photocell can be used therefor. The photodetector 6 is connected with a switching circuit 7 which closes a strobo flash light tube energizing circuit connected therewith when a shutter release signal is transmitted thereto. The switching circuit 7 has a function to distinguish the shutter release signal from other noise signals. The shutter release signal from the photodetector 6 is characterized by a steep rise and a predetermined level which can be distinguished from other noise signals caused by ambient light impinging on the photodetector when the strobo flash light unit S is separated from the camera body C.

The strobo flash light tube energizing circuit connected with the switching circuit 7 is an ordinary well-known circuit including a strobo flash light tube 8, a main discharge capacitor 9, a high voltage DC source 10 and a trigger circuit comprising a trigger capacitor 11, a transformer 12 and a trigger electrode 13. Since the strobo flash light tube energizing circuit is well known in the art, a detailed description thereof is omitted here.

Said switching circuit 7 is connected with the trigger circuit so that the trigger circuit may be energized to discharge the strobo flash light tube 8 upon receipt of said shutter release signal from the photodetector 6.

The photodetector 6 may also be provided within the strobo flash unit S by use of a light guide means such as an optical fiber bundle extending from the foot 5 to the photodetector 6.

In operation of the above described embodiment of the present invention, the photodetector 6 detects the light emitted by the light emitter 2 upon release of the shutter release. Since the light emitted by the light emitter 2 has a steep rise and a predetermined level, the switching circuit 7 connected with the photodetector 6 operates to close the trigger circuit upon receipt of the shutter release signal sent from the photodetector 6. Thus, the strobo flash light tube 8 is discharged in synchronization with the shutter release. Since no electric contact is employed in the present invention, there is no fear of malfunction of the strobo flash light tube energizing circuit due to incomplete contact of electric contacts. Further, there is no fear that the photographer may receive an electric shock since no exposed electric contact is employed in the device.

I claim:

1. A strobo flash light device energized upon release of a shutter in a camera comprising in combination:
   an electric source provided in a camera body, a shutter mechanism provided in the camera body, a switch connected with said electric source closed upon release of said shutter mechanism, a light emitting means connected with said source and said switch for emitting light when said switch is closed, an accessory shoe provided on the camera body having means for transmitting the light emitted by said light emitting means, a strobo flash light tube provided in a strobo flash light unit casing, a strobo flash light tube energizing circuit provided in said casing and connected with said tube, said strobo flash light energizing circuit including a trigger circuit for triggering said tube, a photodetecting means provided in said casing for detecting light impinging thereon, a foot fixed to said casing to be inserted into said accessory shoe for supporting said casing, said foot having means for transmitting the light emitted by said light emitting means to said photodetecting means when said foot is inserted into said accessory shoe, and a switching circuit connected between said photodetecting means and said trigger circuit for closing said trigger circuit when a signal which indicates that the photodetecting means has received light emitted by said light emitting means is given thereto.

2. A strobo flash light device as defined in claim 1 wherein a light guide means is provided between said light emitting means and said accessory shoe for emitting light from the light emitting means on the accessory shoe.

3. A strobo flash light device as defined in claim 1 wherein a light guide means is provided between said photodetecting means and said foot for guiding the light impinging on the foot to the photodetecting means.

4. A strobo flash light device as defined in claim 1 wherein said switching means has a function to distinguish a signal having a steep rise from other noise signals caused by ambient light impinging on the photodetector.

5. A strobo flash light device as defined in claim 1 wherein said light emitting means is a light emitting diode.

6. A strobo flash light device as defined in claim 1 wherein said photodetecting means is a photovoltaic type photodetector.

7. A strobo flash light device as defined in claim 6 wherein said photodetector is a silicon photocell.

8. A strobo flash light device as defined in claim 6 wherein said photodetector is a selenium photocell.

* * * * *